United States Patent [19]

Andersen

[11] Patent Number: 5,771,096
[45] Date of Patent: Jun. 23, 1998

[54] METHOD OF OBTAINING INFORMATION

[75] Inventor: Hans Villemoes Andersen, Hillerød, Denmark

[73] Assignee: Foss Electric A/S, Hillerød, Denmark

[21] Appl. No.: 836,609
[22] PCT Filed: Dec. 7, 1995
[86] PCT No.: PCT/DK95/00492
  § 371 Date: May 13, 1997
  § 102(e) Date: May 13, 1997
[87] PCT Pub. No.: WO96/18089
  PCT Pub. Date: Jun. 13, 1996

[30] Foreign Application Priority Data

Dec. 9, 1994 [DK] Denmark ................................ 1417/94

[51] Int. Cl.$^6$ ................................................ G01B 9/02
[52] U.S. Cl. ........................................... 356/346; 356/345
[58] Field of Search .................................. 356/345, 346, 356/359, 360, 355

[56] References Cited

U.S. PATENT DOCUMENTS 5,251,008 10/1993 Masutani .
5,253,183 10/1993 Inoue et al. .
5,355,086 10/1994 Ratzel .

FOREIGN PATENT DOCUMENTS

A30091692 10/1983 European Pat. Off. .
A20419222 3/1991 European Pat. Off. .
265710 10/1993 United Kingdom .
WO9214997 9/1992 WIPO .
WO9417391 8/1994 WIPO .

Primary Examiner—Frank G. Font
Assistant Examiner—Robert Kim

[57] ABSTRACT

A method is suggested for obtaining information on the electromagnetic spectrum of a sample, the method comprising (a) generating a plurality of substantially identical signals, (b) determining the shape of a first number of the signals by performing a first number of scans of a first range of signal width, (c) determining the shape of a second number of the signals by performing a second number of scans of a second range of signal width, the second range being comprised by the first range and comprising a portion of the first range in which the signals have maximum absolute amplitude, (d) combining data from the first number of scans and the second number of scans so as to obtain data corresponding to the shape of the signals, and (e) performing a mathematical transformation of the combined data so as to obtain the information on the electromagnetic spectrum of the sample. According to this method, the electromagnetic spectrum—and especially an absorption spectrum for use in quantitative analysis of the sample—may be obtained faster than is possible using prior art methods.

19 Claims, 6 Drawing Sheets

METHOD OF OBTAINING INFORMATION

The present invention relates to a method for obtaining information on the electromagnetic spectrum of a sample.

The method according to the invention offers a fast scanning of signals in order to obtain information on the electromagnetic spectrum of a sample without loosing valuable information.

The prior art documents WO-A-92/14997, EP-A-0019692, U.S. Pat. No. 5,355,086 and U.S. Pat. No. 5,253,183 describe various approaches in reducing trasformation artifacts due to different error sources in the measuring spectrum and illustrates alternative methods to that of the present invention.

The present invention is especially suited for use in instruments for use in quantitative determination of components in liquids or solids on the basis of e.g. the absorption spectrum thereof. In typical scanning instruments, the resolution on the absorption axis of the absorption spectrum of the sample will depend on the number of scans taken. This means that obtaining a large resolution on the absorption scale—which is a pre-requisite for performing quantitative analysis—will require a relatively longer measuring time compared to that of qualitative analysis.

For e.g. standard FTIR instruments, obtaining a satisfactory resolution on the absorption axis of the transformed spectrum may easily require performing 2–3 times the number of the scans required for qualitative analysis and, thus, a measuring time 2–3 times larger. However, using the method of the invention, the scanning procedure may be speeded up by a factor of 2 or 3 while retaining the resolution on the frequency axis of the absorption spectrum of the sample. Thus, using the method of the invention, a FTIR instrument may be used for quantitative analysis (that is, with a satisfactory resolution on the absorption axis of the transformed spectrum) using substantially the same measuring time and without loss of resolution on the frequency axis of the transformed spectrum.

Thus, the method of the present invention provides a method which enables typical instruments primarily used for qualitative analysis to also be used for quantitative analysis without loss of resolution and without any substantial increase in the measuring time.

The scanning of e.g. interference signals in FTIR instruments has normally been performed by scanning a number of times over a certain length of the shape of the interference signal. The scan length depends on the resolution required or desired on the frequency scale of the absorption spectra obtained from the instrument. The interference signal typically comprises a well defined maximum amplitude region, and the scan is usually performed symmetrically around this region.

In addition, a smoother absorption spectrum may be obtained using a FTIR instrument by the so-called zero filling method in which the parts of the flanges of the signal outside the scanned part of the signal is assumed to be zero. This artificial extension of the scanned signal smooths the spectra obtained. However, as no additional information from the interference signal is used in this method, no additional information is present in the Fourier transformed spectrum of the zero filled signal.

A faster method of obtaining a large resolution on the frequency scale of an absorption spectrum obtained using a FTIR instrument is performing an asymmetric scanning of the interference signal (phase correction). The interference signal is scanned from a position close to the maximum amplitude region, across this region and further out the opposite flange. From the information in the maximum amplitude region and the scanned flange portion, the shape of the other flange portion (to the width of the scanned flange portion) is calculated. Thus, from an asymmetric scan, the information of a wider, symmetric scan may be generated without actually performing the wide symmetric scan.

The most common way of using FTIR instruments is for qualitative measurements of samples. For qualitative measurements, a high resolution on the frequency scale of the Fourier transformed spectrum is crucial.

Thus, in this type of instrument, a number of wide scans of the signal is performed in order to obtain this high resolution. On the other hand, the resolution on the absorption scale is of less importance, as this type of instrument is more often used to detect the presence of a component than to determine the actual concentration thereof.

Quantitative determination of the components of a sample is at present typically performed on other types of instruments, such as instruments using optical filters. Performing a quantitative measurement on a typical FTIR instrument would, as is described above, require the performance of a relatively larger number of scans of the sample, as the resolution on the absorption scale is affected by the larger noise in the large amplitude portion of the signal. This may easily render the total measuring time unacceptable.

However, using the method of the present invention, a typical FTIR instrument will be able to perform quantitative determination of samples either without any increase in measuring time and with only a small reduction in the resolution on the frequency scale or with the retention of the resolution on the frequency scale and only a small increase in the measuring time.

The absorbance spectra of especially liquids but to a certain degree also solids show relatively broad absorption peaks, whereby a relatively poor resolution on the frequency axis will suffice, when determining the concentration of components in liquids and solids. However, in order to be able to precisely determine these concentrations, the resolution on the absorbance axis should be relatively large. Thus, according to the invention, a typical instrument may, using the same measuring time, obtain a suitable resolution on the absorption axis of the transformed spectrum and a slightly reduced resolution on the frequency axis; The latter typically being acceptable when performing measurements on liquids and solids.

Thus, the present invention concerns a method for obtaining information on the electromagnetic spectrum of a sample, the method comprising generating a plurality of substantially identical interference signals, determining the shape of a first number of the signals by performing a first number of scans of a first range of signal width, determining the shape of a second number of the signals by performing a second number of scans of a second range of signal width, the second range being inside the first range and comprising a portion of the first range in which the signals have maximum absolute amplitude, combining data from the first number of scans and the second number of scans so as to obtain data corresponding to the shape of the signals, and performing a mathematical transformation of the combined data so as to obtain the information on the electromagnetic spectrum of the sample.

In the present context, the shape of a signal may be the signal's variation in time or as a function of another variable factor. This shape may be the variation of the voltage or current or another characterizing, measurable quantity output by an optical detector or other detecting or sensing means.

In the present context, a scan is a series of detections or measurements of the characterizing quantity of the signal. Presently, a number of scans may be a single scan or any number of scans higher than one. At present, it is preferred that both the first and the second number of scans are even numbers.

The range in which a scan is performed may be defined in a number of ways depending on the signal being scanned. If the signal is varying in time, the range of the scan may be defined as a period of time during which the signal is scanned. However, there may be alternative ways of defining the range of a scan. If the signal is e.g. a signal from an interferometer having two light paths of which the optical path length of one is varied by translating a mirror, the interference signal output of the interferometer will vary with the translation of this mirror. Thus, the range of a scan of this signal may be defined by the translational position of the movable mirror.

As described above, the scans of the signals may be performed by determining the amplitude of the signals at a multitude of positions along the shape of the signals.

Depending on the actual combination of the data obtained from the scans and on the purpose thereof, the position of the second range inside the first range may be chosen. If the purpose of the combination of the data is the statistical suppression of noise, where the noise is largest in the parts of the signal having the largest amplitude, it is preferred that the second range comprises substantially all parts of the interference signal wherein the absolute amplitude of the interference signals is at least 1%, such as at least 5%, preferably at least 10%, of the maximum absolute amplitude of the interference signal. Thus, the parts of the signal wherein the noise is the largest are scanned the largest number of times. This may, if the combination of the data is e.g. a simple summing of the measurements, reduce the signal-to-noise-ratio of the measurements.

It should be understood, that the actual order in which the first and second number of scans are performed will in most situations not affect the method of the invention and the advantages thereof.

In a first aspect of the invention, the signals may be oscillating signals such as oscillating signals generated by NMR. Usually a large number of these signals are summed in order to obtain the data required. Using the method of the invention, the measuring time of NMR-operations may be reduced.

NMR-operations generate one type of electromagnetic spectrum. Other types of electromagnetic spectra from which information of samples may be derived are absorption spectra, reflection spectra and transmission spectra.

In a second, presently preferred aspect of the present invention, the plurality of substantially identical signals are interference signals generated by an interferometer, such as an interferometer comprising two light paths of which the optical length of one may be varied. A preferred interferometer of this type may be found in Fourier Transform InfraRed (FTIR) instruments.

Depending on the requirements of the actual instrument performing the method of the invention and on the speed of the scans, it may be preferred that the first number of scans is less than 100, such as less than 50, preferably less than 30, such as less than 10, such as less than 5, preferably less than 3, such as 2.

If it is preferred that the scanning procedure is performed as fast as possible, it may be preferred that the first number of scans is as little as possible. However, reducing the first number of scans may reduce the quality of the results, such as the frequency resolution of a FTIR instrument (see the examples), whereby a compromise is often made.

It is presently preferred that the second number of scans is larger than 1, such as larger than 2, preferably larger than 6, such as larger than 8.

In FTIR instruments or the like in which the final mathematical transformation is a Fourier transformation, the computational implementations of this transformation require the measurements performed in the first and second numbers of scans to be performed equidistantly as a function of the optical path length variation.

Naturally, as is the case with the width of the scans, the number of scans will depend on the actual use of the method of the invention. However, at present it is preferred that the number of measurements of each of the first number of scans is larger than 100, such as larger than 500, preferably larger than 1000, such as larger than 5000, preferably larger than 8000 in order to have a sufficient resolution in the detection of the shape of the signals. This resolution will influence the resolution of the resulting spectrum obtained.

As described, the final mathematical transformation may be a Fourier transformation. However, other transformations such as a cosine transformation, a sine transformation, a Hadamar transformation, a Hilbert transformation, a Hartley transformation or a Wavelet transformation may also be used in certain implementations of the present invention, depending on the type of signal and on the type of information required from the electromagnetic spectrum of the sample.

The information required from the electromagnetic spectrum of the sample naturally depends on the actual situation in which the method of the present invention is used. When e.g. determining the concentrations of components in e.g. liquids, absorption peaks in the absorption spectrum are widely used in order to determine the absorption of the components. The actual concentrations of the components are subsequently calculated on the basis of a calibration as known per se.

Thus, the information of the electromagnetic spectrum of the sample may be the absorption of the sample in a number of well defined wavelengths. However, it is presently preferred that this information is the actual absorption spectrum of the sample as typically determined by e.g. a FTIR instrument.

In the case of the absorption spectrum or absorption peaks thereof being used for the determination of the concentrations of components in the sample, a certain resolution on the absorption axis of the absorption spectrum is required in order to give a certain accuracy on the determined concentrations. Thus, it is presently preferred that the resolution on the absorption axis of the absorption spectrum of the sample is better than 0.1 absorbance units, such as better than 0.08 absorbance units, preferably better than 0.05 absorbance units, such as better than 0.03 absorbance units, preferably better than 0.02 absorbance units, such as in the order of 0.01 absorbance units.

Furthermore, if the information required is the absorption spectrum, it is preferred that the resolution on the frequency axis of the absorption spectrum of the sample is better than 200 $cm^{-1}$, such as better than 100 $cm^{-1}$, preferably better than 75 $cm^{-1}$, especially for NIR purposes, and better than 50 $cm^{-1}$, such as better than 30 $cm^{-1}$, preferably better than 25 $cm^{-1}$, especially for mid-IR purposes, in order to be able to derive the required information from the spectrum.

In the above, only two different scan widths are described. It may, however, be preferred to use more than two widths. If, for example, the use of different scan widths is due to a compromise of a fast scanning routine and a sufficient suppression of the noise in the signal, a third scanning width may further reduce the measuring time of the scanning of the signals as one or more longer scans may be replaced by one or more scans of a third width (typically having a width between the first and second ranges).

Thus, it may be preferred to have the shape of a third number of the signals determined by performing a third number of scans of a third range of signal width, the third range being comprised by the first range and comprising a portion of the first range in which the signals have maximum absolute amplitude, the data from the third number of scans being combined with the data from the first number of scans and the second number of scans so as to obtain the data corresponding to the shape of the signals.

Even though the present invention is especially suited for and described in connection with FTIR instruments, it should be understood that also other types of instruments, typically instruments using Fourier Transformation, such as FT-Raman instruments or NMR-instruments are able to obtain the same benefits from the present invention.

The invention and preferred embodiments thereof will now be described in connection with the figures, wherein.

The output of the interferometer of a standard FTIR instrument is, as a person skilled in the art will know, an interference signal depending on the position of the movable mirror in the instrument.

Figure 1:
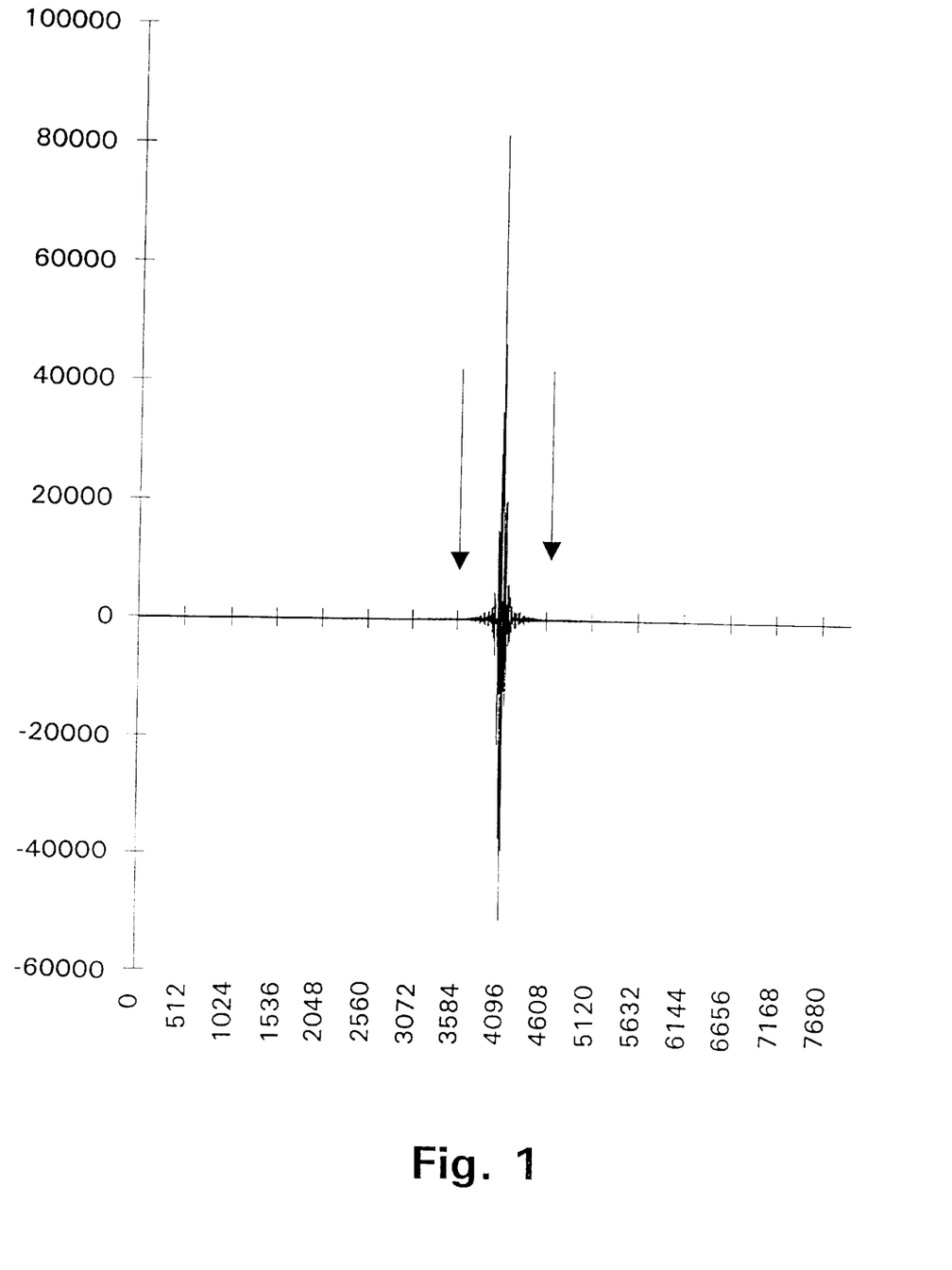
FIG. 1 illustrates a typical interference signal of water from an interferometer of an FTIR instrument.

As the movable mirror is translated from one outer position to the other outer position, an interference signal of the type illustrated in FIG. 1 will be output from the interferometer and detected by a detector.

The shape of the interference signal will depend on the absorption spectrum of the sample in question; A sample having an absorption spectrum with soft shapes will generate an interference signal as that of FIG. 1 with a narrow center burst comprising only a few large amplitude peaks, whereas a sample having an absorption spectrum with sharp peaks will generate an interference signal in which a larger number of large amplitude peaks are present in a larger area of the interference signal.

In standard FTIR instruments, the detected interference signal is subjected to a Fourier transformation in order to obtain an absorbance spectrum of the sample introduced in the instrument. In order to be able to perform the Fourier transformation, the shape of the interference signal is scanned at equidistant positions along the movement of the moving mirror. Often this equidistancy is ensured by launching laser light into the interferometer and e.g. trigging the measurements of the shape of the interference signal on zero-crossings of the also interfering laser light, or alternatively by using a phase lock loop.

In the present context, the initialization of the FTIR instrument so as to assure that the largest peaks of the interference signal are present at the middle of the scanning area (if this is desired) and the selection of scan width in accordance with the desired resolution on the frequency scale of the Fourier transformed spectrum will be known to the skilled person.

It is well known that the width of the scan defines the resolution of the frequency scale of the Fourier transformed spectrum. The information in the flanges of the interference signal is important to the resolution on the frequency scale.

If the width of the scan is extended, the resolution on the frequency scale will be increased. However, this will also increase the measuring time with a factor of the enhancement of the resolution to the power of 3, when retaining the S/N ratio of the measurement! This is the reason why the width of the scans are usually kept to a required minimum.

A compromise is often made: a better resolution on the frequency scale will, for the same measuring time, give a lower S/N of the measurement of the shape of the interference signal (using a fewer but wider scans of the shape).

The resolution on the absorption scale of the transformed absorption spectrum, on the other hand, has been found to mostly depend on the information comprised in the large amplitude portion of the interference signal, that is, where the largest part of the energy of the interference signal is represented.

The noise of the interference signal is typically larger in the large amplitude portion of the interference signal due to e.g. non-linearity of the detector. This has little effect, when one is only interested in the resolution on the frequency scale, as the noise in the important flanges of the interference signal is relatively small.

However, when the information in the large amplitude portion is of importance, a larger number of scans should be performed in order to statistically suppress this relatively larger noise. This, however, has the disadvantage that the measurement time of the instrument will be increased due to the requirement of more scans.

In addition, as a small change of the actual amplitude of the peaks of the large amplitude portion of the signal will give a large change on the absorption scale of the transformed spectrum, a large resolution on the absorption scale is only obtained if a large number of scans of the large amplitude portion of the shape of the interference signal is performed.

As the noise is larger in the large amplitude portion, this sensitivity to amplitude variation may give unsuitable results, if the noise is not reduced, such as by increasing the number of scans and, thus, statistically suppressing the noise.

Amplitude variation may also occur due to imperfect repetition of the scanning of the signal, such as due to vibration of the instrument. Thus, a larger number of scans of this part of the signal will further make the instrument more immune to e.g. vibrations, as the effect thereof is eliminated statistically.

As will be shown in Example 2, a resolution on the absorption axis corresponding to 6 full scans may in fact be obtained in the time of 2¼ times that of a full scan using the method of the invention and with the retention of a resolution on the frequency axis corresponding to that defined by the length of the full scan.

EXAMPLE 1

As described above, the present invention is well suited for use in standard FTIR instruments, and especially in FTIR instruments which are to be used for quantitative determination of components in liquid samples such as milk or milk products or in solid samples such as cheese or grain.

As the absorption peaks of milk are relatively wide, a high resolution on the frequency scale of the Fourier transformed spectrum is not required. On the other hand, a high resolution on the absorbance scale of the Fourier transformed spectrum is required in order to be able to determine the concentrations of the components in the sample on the basis of the determined absorbance of the components.

Another requirement, or at least highly desired feature, of an analyzing instrument is a short measuring time. Naturally, the optimal analyzing instrument has a high accuracy and a short measuring time, so that a large number of measurements may be performed. Using the method according to the invention, existing FTIR instruments may be made faster while retaining the S/N and the resolution of the measurements, when used for quantitative measurements, cf. below.

According to the presently preferred embodiment, 2 scans of a total of 8192 measurements (8k) are performed over the shape of the interference signal and 8 scans of 1024 (1k) measurements are performed over the large amplitude part (See the area between the arrows in FIG. 1) of the signal using a sample frequency of 1500 Hz.

As the amplitude of the noise to a certain degree resembles that of the interference signal, it is preferred that the large amplitude part, which is scanned a larger number of times, comprises those parts of the interference signal comprising the largest amplitudes and only leaves the low-amplitude flange portions outside the large amplitude part to be scanned only a few times.

In the present instrument, this procedure takes 20 seconds, whereby a single translation of the movable mirror from one end position to the other end position takes approx. 5.82 seconds, a single translation of the mirror over the large amplitude portion takes 0.68 seconds and on the order of 0.13 seconds of waste time is included, each time the direction of movement of the mirror is reversed. In comparison, 10 scans over the full length of the interference signal would take on the order of 61 seconds.

In order to only perform a single Fourier transformation of the measured shape of the interference signal, the measurements from the 10 scans are transformed into a single data file representing the shape of the signal. The data of this data file is subsequently subjected to Fourier transformation in order to obtain the absorption spectrum of the sample.

When all determinations of the shape of the signal are performed at the same locations of the shape—in the following called channels, which is the typical situation in FTIR instruments; this transformation is relatively simple. Thus, measurements of the two long scans are simply added pair-wise in the individual channels and the measurements of the shorter scans are added to the relevant channels in the large amplitude portion of the longer scans.

In order not to perform the Fourier transformation on a distorted shape of the signal (the large amplitude part is scanned 10 times and the flange parts only 2), the added measurements of the parts outside the large amplitude part are multiplied by a factor 5. Performing the Fourier transformation on a distorted shape would create ripples over the Fourier transformed spectrum. Thus, the shape of the signal represented by the final data file should be a non-distorted representation of the signal, where a relatively larger number of scans have been performed on the large amplitude portion of the signal, increasing the S/N of these measurements.

Figure 2:
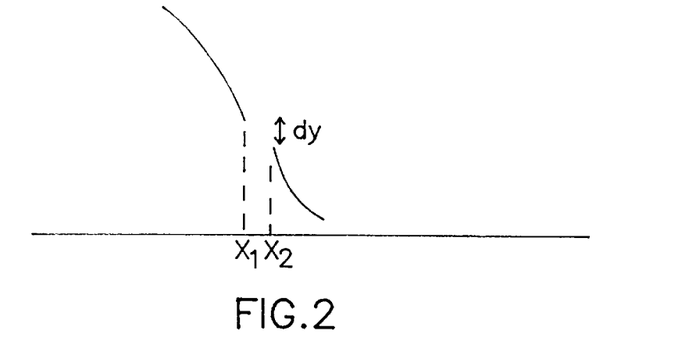
FIG. 2 illustrates the removal of an offset between the large amplitude portion and the flange portion.

However, as there may exist a small offset $d_y$ (See FIG. 2.) between the outer most data point $x_1$ of the data representing the large amplitude portion of the signal and the neighbouring data point $x_2$ representing a flange portion, all measurements at the relevant flange portion of the signal are added a constant $d_y$ in order to remove this offset. Naturally, this is performed for both flanges of the signal.

Finally, the data file is subjected to discrete Fourier transformation in a manner known per se.

When performing the addition of the measurements in the time domain (before Fourier transformation), care should be taken when adding the measurements and thus superimposing the scanned shapes, as a small translation (phase translation) of one measured shape compared to another will give a distorted superimposed shape of the signal, which again may introduce a large error in the final results. Naturally, the purpose of adding the measurements is to reduce the noise of the signals. However, the resulting added signal shape should resemble the actual shape of the signals, whereby phase translation is preferably avoided.

In order to ensure a correct addition of the measurements, the largest absolute value of each scan may be determined, and one scan is translated (in steps of one sample point) so that these values are added in the same channel. This may ensure that the measured shapes are correctly superimposed.

However, it is presently preferred to select a small window (21 measuring points) around the largest absolute value of the scans and to translate one signal (still in steps of one sample point) to obtain the best correspondence between the shapes represented by the measurements. This correspondence is determined by subtracting the parts of the spectra within the window and summing the differences in the channels within the window. One signal is now translated and the sum is recalculated. The signals are correctly added, when the sum is minimum.

Before performing the Fourier transformation of the scanned signal, it is often preferred to multiply this signal with a window function—to perform a so-called apodization is performed. The main function of this window function is the suppression of ripples in the Fourier transformed spectrum. A Fourier transformation of a signal having a finite length assumes all measuring points outside the signal to be zero. The abrupt step between the last measuring points of the signal and the adjacent assumed zero values gives rise to ripples over the Fourier transformed spectrum. This effect is reduced by the window function, as this function reduces the size of the step.

Figure 3:
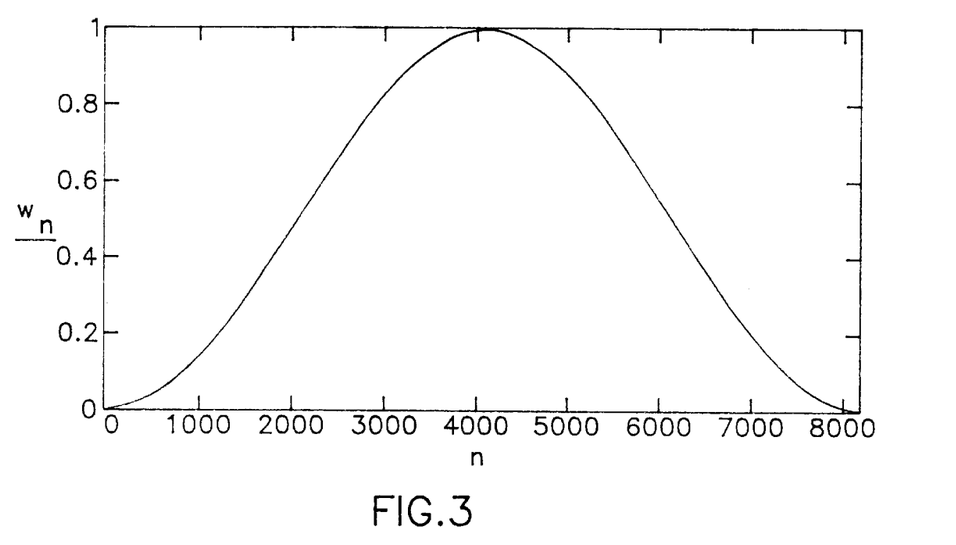
FIG. 3 shows a typical window function for apodization of the detected interference signal.

In addition to the above desirable effect of the window function (See FIG. 3), this function furthermore amplifies the effect that the noise in the flanges is reduced, compared to the noise of the large amplitude portion, as this function reduces the measured values and thus also the noise—but mainly in the flanges and only to a smaller degree in the large amplitude portion.

This effect will be further described in Example 2.

Another feature which may affect the results of the scans may be hysteresis in the movements of the mirror or in the detection or sampling electronics. In the present invention, the measurements of the shape of the interference signals are trigged by zero-crossings of laser light also being launched into the interferometer. In this manner, it is assured that the measurements of the interference signal are performed equidistantly and in the same points on the shape of the interference signal in each scan.

Figure 4:
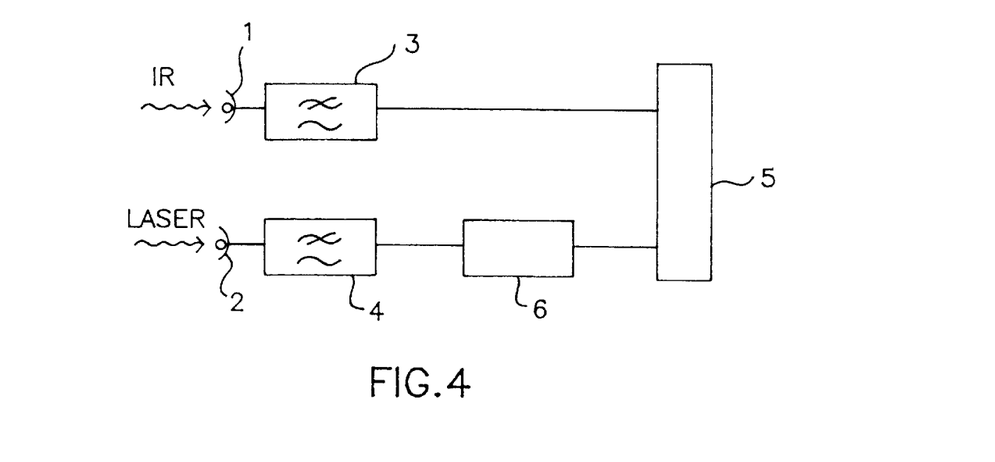
FIG. 4 is a block diagram illustrating the removal of a delay in the detection electronics.

In FIG. 4, a typical setup for the detection of the light from the interferometer and the measurement of the interfering IR light is illustrated. Light detectors 1 and 2 detect the interfering IR light and laser light, respectively. A sample-and-hold circuit 5 samples the amplitude of the IR light, when the detector 2 detects a zero-crossing of the interfering laser light.

However, if filters, such as low pass filters 3 and 4, are positioned between the light detectors 1 and 2, respectively, and the sample-and-hold circuit 5 performing the actual measurements of the IR signal, different time delays may occur in these filters 3 and 4. Typically, the time delay of the higher frequencies in the filter 4 is smaller than that of the lower frequencies seen in the filter 3 filtering the interference signal.

This will affect the measurements of the interference signal, as the positions of the measurements on the shape of the interference signal will not be the same when the moving mirror is translated in the two directions.

In order to remove this undesired effect, an electronic delay 6 may be inserted after the low pass filter 4 so as to eliminate the difference in the time delays.

Furthermore, it may be desired or required to assure that the number of scans performed over a certain width of the interference signal is always a multiplum of two; half the scans are performed during translation in one direction and the other half during scan in the other direction. This may be the case if the moving mirror is slightly tipped during translation. In this situation, the mirror is tipped in different directions when translated in the two directions, whereby different measurements may be generated when scanning in the two directions, even though the scans are performed over the same area of the same signal. This effect may be removed by ensuring that scans are always taken so that half the scans are performed when scanning in one direction and the other half when scanning in the other direction. The discrepancy is subsequently removed when adding the results of the scans.

However, single scans of a given width may be performed despite of a such imperfection of the instrument, if it is assured that this actual scan is always taken when the mirror is translated in the same direction. In this way, discrepancy due to differences in the detected interference signals due to this effect may be avoided.

EXAMPLE 2

Comparison of an Embodiment of the Method of the Present Invention and a Typically Used Prior Art Method In the following, a comparison is made between the situation wherein 6 full scans are made (prior art) and the situation wherein one full scan and 5 short scans are made according to the invention, all scans being performed using a typical FTIR instrument (using a standard HeNe laser) on pure water. The comparison is made both with and without the use of apodization.

Figure 5:
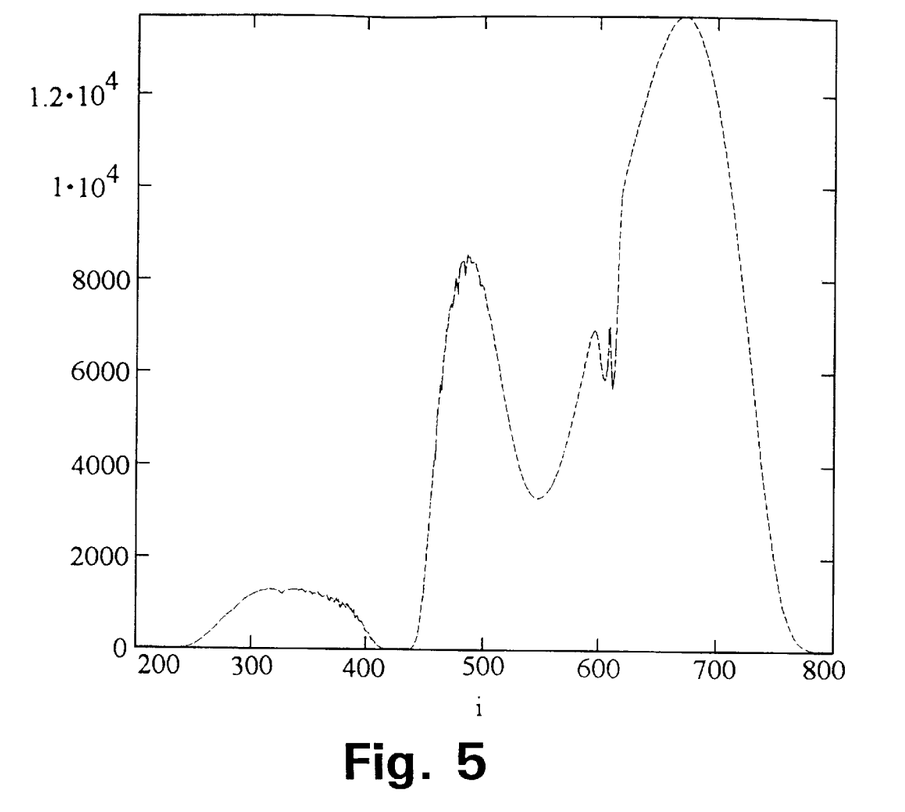
FIG. 5 is a typical absorption spectrum of water.

The absorption spectrum of water (See FIG. 5) has quite soft shapes, whereby the main energy of the interference spectrum will be in a short center burst, as described above and seen in FIG. 1, and only a small part of the energy is represented in the flanges. 6 scans of interference signals from water are taken using N:=8192 scanning points, resulting in 6 measurements $op_{0-5}(n)$, n:=0 . . . 8191.

The Hann (Hanning) function $$w_n := \left(1 - \cos\left(2 \cdot \pi \cdot \frac{n}{N}\right)\right) \cdot 0.5$$

is multiplied onto these measurements as a window function; This generates the data sets $a_{0-5}(n)$.

The corresponding Fourier transformed absorption spectra are $FA_{0-5}(n)$ for the measurements $op_{0-5}$, and $Fa_{0-5}$ for the data sets $a_{0-5}$, respectively.

The mean spectra FAA and Faa are calculated for the spectra $FA_{0-5}$ and $Fa_{0-5}$, respectively. In fact, the mean spectrum Faa is that illustrated in FIG. 5, where the area 200–800 on the x axis corresponds approx. to the wavelength area of 3 $\mu$m to 10 $\mu$m.

In order to generate the data of the 5 short scans and the single long scan, the 1024 points symmetrically positioned around the large amplitude portion of the interference signal of the 6 measurements $op_{0-5}$ is used. Thus, the data sets $B_{0-5}(m)$, m:=0 . . . 1023, are generated.

As the flange portions of these scans, the flange portions of $op_3$ are used. These data sets are multiplied with the Hann function to generate the data sets $b_{0-5}$.

Even though all "short" scans have 8192 measuring points, the flange portions of these scans are identical, whereby these scans only contain information corresponding to one long scan and 5 short scans.

The corresponding Fourier transformed absorption spectra are $FB_{0-5}(m)$ for the measurements $B_{0-5}$, and $Fb_{0-5}$ for the measurements $b_{0-5}$, respectively.

The mean spectra FBB and Fbb are calculated for the spectra $FB_{0-5}$ and $Fb_{0-5}$, respectively.

Now the standard deviations between the individual spectra and the corresponding mean spectra are calculated

| | |
|---|---|
| Std dev (FAA − $FA_0$) = 1.237 | Std dev (FAA − $FA_1$) = 1.376 |
| Std dev (FAA − $FA_2$) = 1.067 | Std dev (FAA − $FA_3$) = 1.311 |
| Std dev (FAA − $FA_4$) = 1.275 | Std dev (FAA − $FA_5$) = 1.239 |
| Std dev (FBB − $FB_0$) = 1.333 | Std dev (FBB − $FB_1$) = 1.465 |
| Std dev (FBB − $FB_2$) = 1.213 | Std dev (FBB − $FB_3$) = 1.311 |
| Std dev (FBB − $FB_4$) = 1.373 | Std dev (FBB − $FB_5$) = 1.346 |
| Std dev (Faa − $Fa_0$) = 1.107 | Std dev (Faa − $Fa_1$) = 1.06 |
| Std dev (Faa − $Fa_2$) = 0.725 | Std dev (Faa − $Fa_3$) = 1.031 |
| Std dev (Faa − $Fa_4$) = 1.056 | Std dev (Faa − $Fa_5$) = 1.052 |
| Std dev (Fbb − $Fb_0$) = 1.132 | Std dev (Fbb − $Fb_1$) = 1.084 |
| Std dev (Fbb − $Fb_2$) = 0.769 | Std dev (Fbb − $Fb_3$) = 1.031 |
| Std dev (Fbb − $Fb_4$) = 1.064 | Std dev (Fbb − $Fb_5$) = 1.072 |

A total standard deviation for each type of spectrum is determined:

$$\sqrt{\sum_0^5 \text{var}(FAA - FA_x)} = 3.071 \quad \sqrt{\sum_0^5 \text{var}(FBB - FB_x)} = 3.380$$

$$\sqrt{\sum_0^5 \text{var}(Faa - Fa_x)} = 2.482 \quad \sqrt{\sum_0^5 \text{var}(Fbb - Fb_x)} = 2.632$$

It is seen that the standard deviation of the short scans is only 6–10% higher than that of the long scans (3.38/3.07= 1.101 and 2.63/2.48=1.06), whereas the total measuring time of one long and 5 short scans is only on the order of 37.5% of that of 6 long scans.

The percentage of the scanning time of the 6 long scans required to obtain-the same resolution using the method of the invention may be calculated: $(1.06)^2*13/48=0.30$, if 1.06 is the deterioration of standard deviation (6% worse), and if 13/48 is the reduction in measuring time obtained using the method of the invention. Thus, the same standard deviation may be obtained according to the invention on approx. a third of the measuring time required using the prior art method.

Figure 6:
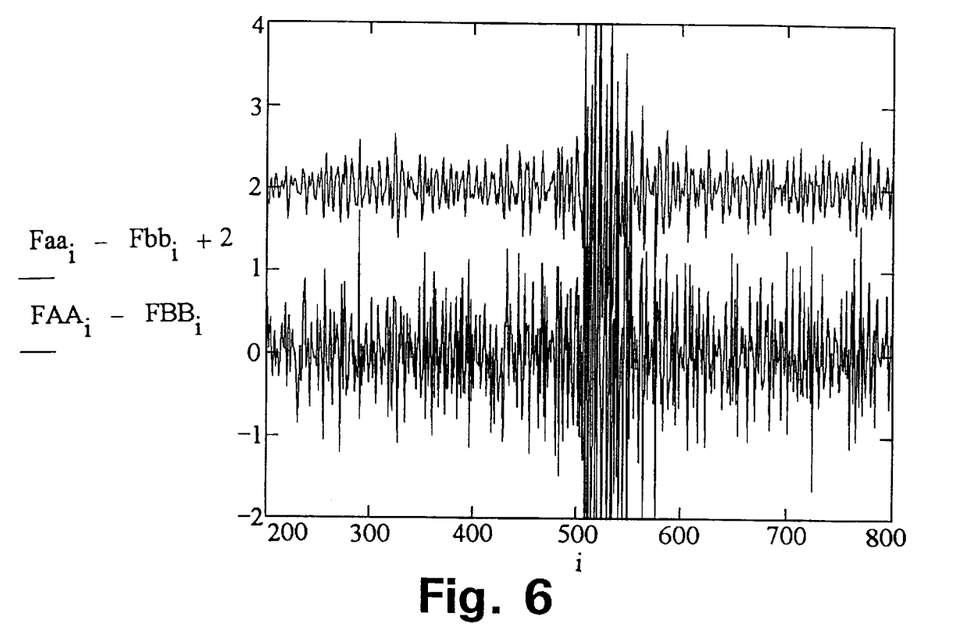
FIGS. 6–8 illustrate difference spectra for the illustration of the noise contents in the large amplitude portion and the flange portions, respectively.

The effect of the apodization may be seen from FIG. 6 illustrating the difference between the mean spectra of the short and the long scans, with and without the window function (Faa–Fbb and FAA–FBB), respectively. On this figure, the Faa–Fbb spectrum has been offset by a constant of 2 in order to better separate the spectra. It is seen that the use of the window function drastically reduces the difference between the mean spectra of the short and the long scans. Thus, the use of the window function increases the resolution on the absorption scale of the transformed absorption spectrum of the sample.

However, as using the window function may slightly decrease the resolution on the frequency scale of the transformed absorption spectrum due to the suppression of the information of the flanges, it may be desired to prolong the long scan of the interference signal in order to compensate for this effect. This effect is known from standard FTIR instruments. Even though this will slightly increase the required measuring time, this reduction is minimal as only a relatively small number of the longer scans are required according to the invention.

Figure 7:
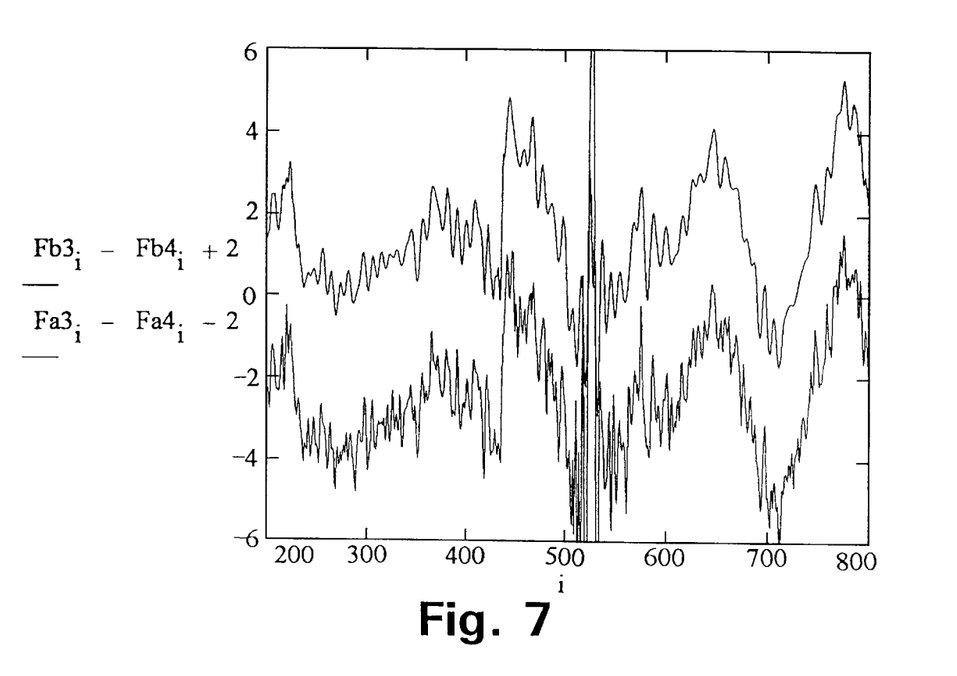

The deviation between two short scans and between the corresponding two long scans (it should be remembered that the large amplitude portion of e.g. $Fb_3$ and $Fa_3$ is the same) may be seen from FIG. 7 illustrating the difference spectrum $Fb_3-Fb_4$ offset by 2 and $Fa_3-Fa_4$ offset by –2, respectively. It is seen that the general lines of the difference spectra are the same and that the difference is a high-frequency contribution generated by the flanges of the measurement $op_4$. Thus, the resolution on the absorption scale of the transformed spectrum is not increased using longer scans. This is in accordance with the fact that it requires 8 times the measuring time when increasing the length of the scan by a factor of 2, if the S/N (and thereby the resolution on the frequency axis) is to be retained.

Figure 8:
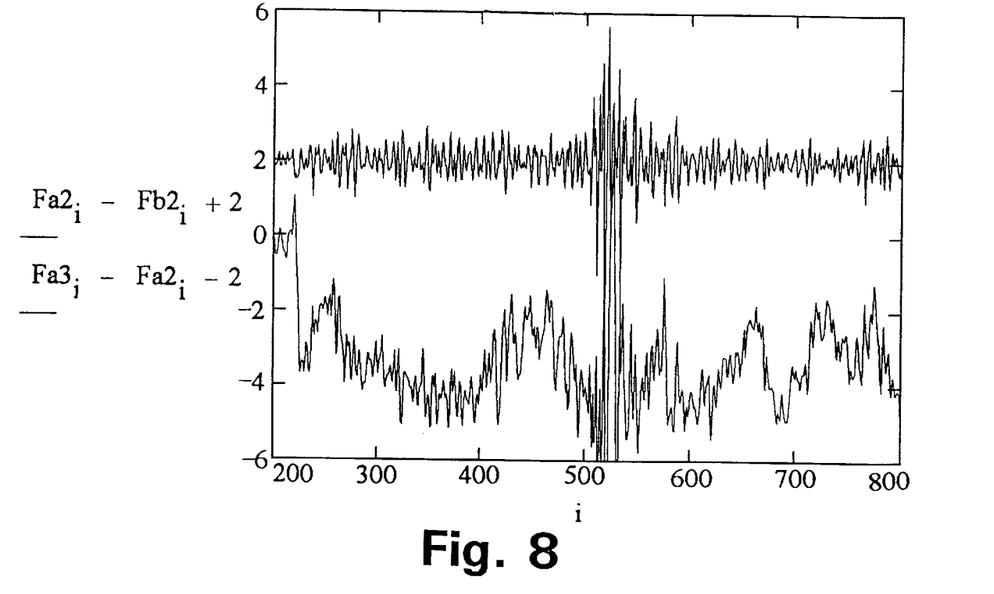

That the spectra obtained from the long and the short scans are very similar may be seen from FIG. 8 illustrating the difference spectrum $Fa_2-Fb_2$ offset by 2. These data sets have the same large amplitude portion of the interference signal but different flanges ($Fb_2$ has the flanges of $op_3$ and, thus, $Fa_3$).

FIG. 8 also illustrates the difference spectrum $Fa_3-Fa_2$ offset by –2. The corresponding interference signals have been obtained independently and thus have different large amplitude parts and flange parts. This may also be seen from the difference being larger than the spectrum $Fa_2-Fb_2$. Thus, it is seen that a difference in the large amplitude portion of the interference signal has a relatively larger effect on the resolution on the absorbance scale than a difference in the flanges. Therefore, a relatively larger number of scans of the large amplitude portion is required in order to obtain a large resolution on the absorption scale.

Figure 9:
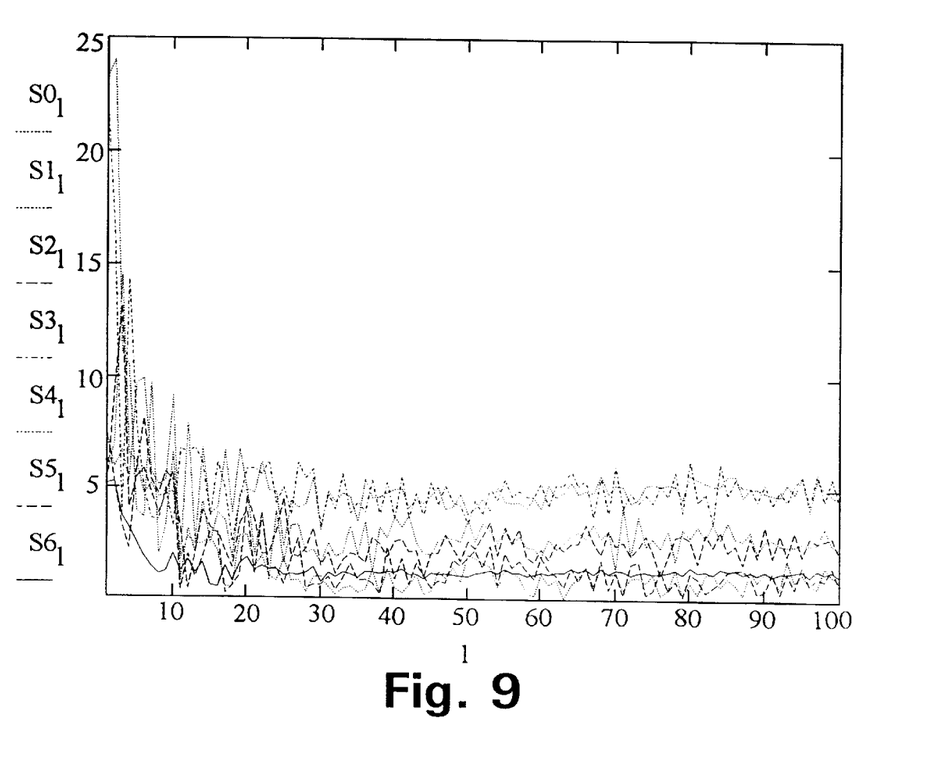
FIGS. 9 and 10 illustrate the noise contents of difference spectra in order to evaluate the importance of the noise in the large amplitude portion and the flange portions, respectively.

In order to make a frequency analysis of the noise of the spectra, the difference spectra $Faa-Fa_{0-5}$ are again Fourier transformed into $S_{0-5}$. FIG. 9 illustrates the frequency contents of these difference spectra. It is seen that the main part of the noise clearly is low frequent.

Figure 10:
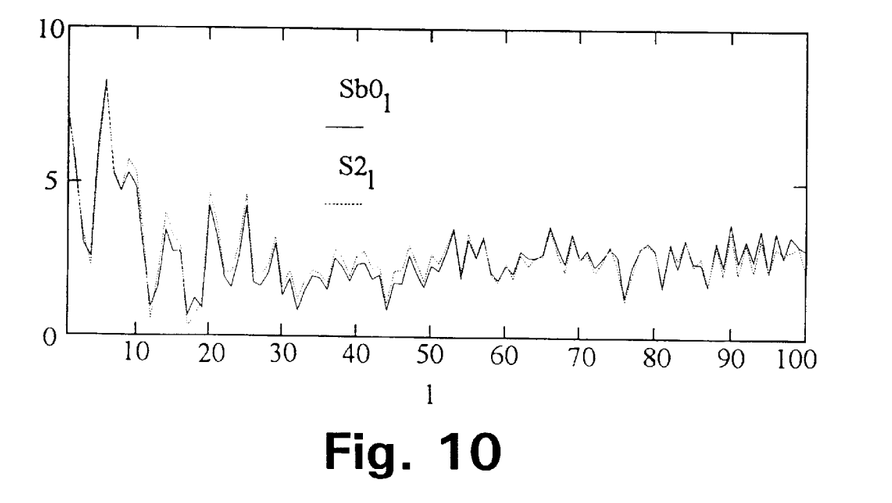

The noise spectrum $Sb_2$ of the difference spectrum $Fbb-Fb_2$ is calculated and compared to the corresponding spectrum $S_2$ of the long scans. These two signals have the same large amplitude portion but different flange portions. These two spectra are illustrated in FIG. 10, where it is seen that the frequency distribution of the noise of the signals is almost exclusively determined by the large amplitude portion of the interference signal—where the noise is also the largest.

Thus to conclude, it is clear that the use of apodization reduces the effect of noise in the flanges of the interference signal. This means that an even smaller number of scans of the flanges is required in order to reduce the noise in this part of the interference signal and, thus, obtain a desired S/N in this region. As described above, it may, however, be desired to slightly prolong these scans in order to retain the resolution on the frequency scale of the transformed spectrum.

At the same time as reducing the noise in the flanges, the noise of the large amplitude portion of the interference signal is maintained by the window function. This, however, is reduced by the larger number of scans performed of this portion of the signal in order to obtain a suitable resolution on the absorption scale of the absorption spectrum.

Even though in the above, the method of the invention is merely described as a method using two different lengths of the scans, naturally several different lengths of scans may be used. In fact, it is very likely that using a large number of different scan lengths would optimize the resolution on the axes and the measuring time. The scans may e.g. be chosen so that the number of measurements performed on a given position on the interference signal relates to the amplitude of the noise in that part of the signal; a large number of scans in the large amplitude portion and a reduced number in the flange regions relating to the "distance" from the large amplitude portion corresponding to the shape of the amplitude of the noise.

EXAMPLE 3

Comparison of the Standard Deviation for Different Scanning Patterns During Vibration of the Instrument A comparison has been made between different scanning patterns all using the same measuring time: the time required by three long scans over 8192 measuring points.

During relatively strong vibration of the instrument, the concentrations of the three main components of milk (fat, protein and lactose) were determined from the absorbance spectra of a "zero liquid" consisting of water added 0.1% triton, obtained in an FTIR instrument in a manner known per se using a standard calibration for milk.

Naturally, the concentrations of the above three components are zero in the zero liquid. However, the determinations of these concentrations are still applicable in order to determine the standard deviation of the instrument.

The advantage of using this zero liquid and not milk is that the zero liquid may be kept in the cuvette of the instrument during all measurements, whereby the same conditions prevail for all measurements of all scanning patterns.

A total of 20 determinations of the three components are performed for each scanning pattern.

Vibrations introduce a large "noise" in the large amplitude portion of the interference signal, as the positions of the peaks therein may be displaced during the scanning of the signal due to the vibration of the instrument.

Figure 11:
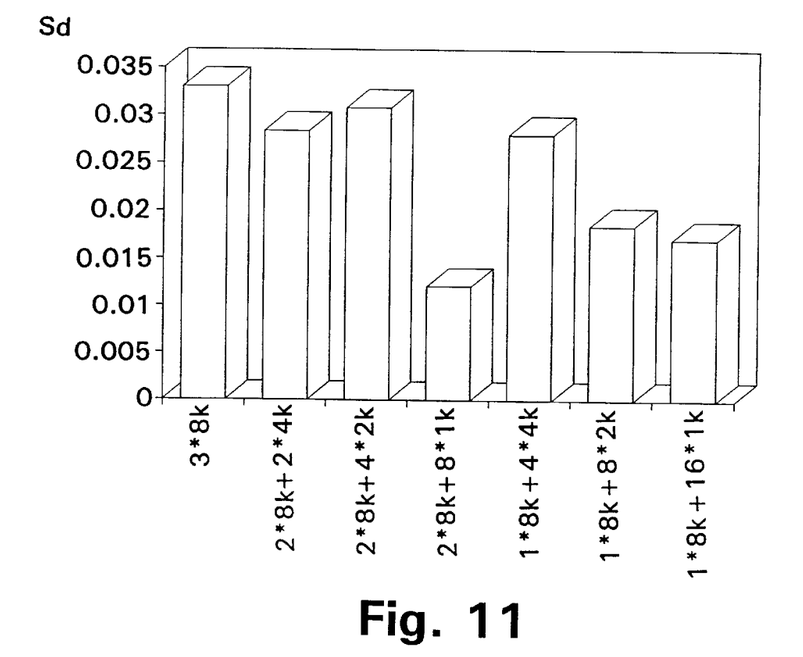
FIG. 11 illustrates the standard deviation obtained using different scanning patterns while inducing additional noise by vibrating the instrument.

The standard deviation (being the sum of the standard deviations of the three components) of the determined concentrations are illustrated in FIG. 11 for a number of different scanning patterns.

All scans are performed symmetrically around the large amplitude portion of the interference signal.

The resolution on the frequency scale of the Fourier transformed spectra are for all scanning patterns the same, as all scanning patterns comprise a longest scan of 8192 points.

It would be expected that the standard deviation of 2*8k+4*2k would be smaller than that of 2*8k+2*4k, as the large amplitude portion is scanned more times in the first pattern. However, it is contemplated that this discrepancy is due to statistical variation.

It is also expected that the standard deviation of 1*8k+16*1k would be at least as small as that of 2*8k+8*1k. However, as described above, the single scan of 8k may have been performed in different directions in the 20 measurements, whereby a larger standard deviation may be obtained.

In addition, having performed more than 8 scans of the large amplitude portion, the noise in this region may be reduced to a level where the noise in the other parts of the signal dominates so that the increased number of scans in the latter scanning pattern further reduces the noise in these parts of the signal. The optimum number of scans of the large amplitude portion may, however, vary from situation to situation.

EXAMPLE 4

Comparison of the Standard Deviation for Different Scanning Patterns Without Vibration of the Instrument The standard deviation of an instrument not being exposed to external influences will illustrate the noise of the instrument itself.

Figure 12:
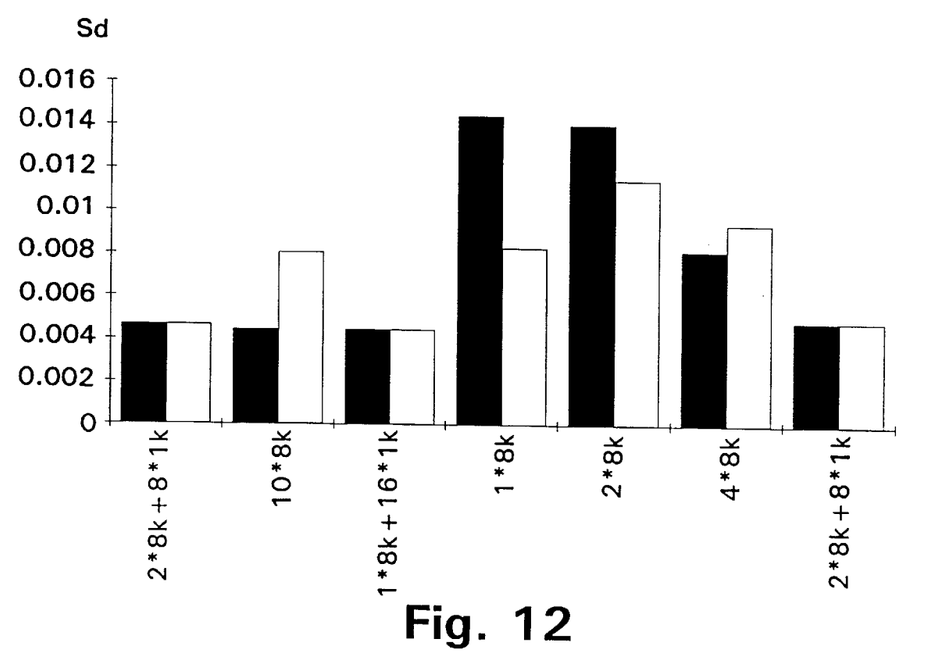
FIG. 12 illustrates the standard deviation obtained using different scanning patterns without vibration of the instrument in order to evaluate the noise of the instrument itself.

In the present example, a number of different scanning patterns requiring different measuring times have been tested. The instrument setup and the sample (zero liquid) are the same as in Example 3. The standard deviation of the measurements are illustrated as solid black columns in FIG. 12.

The standard deviation is additionally adjusted so as to correspond to the same measuring time using the square of the measuring time. The adjusted standard deviations are illustrated as white columns in FIG. 12. Again, the Fourier transformed absorption spectra obtained have the same resolution due to all scans having a longest scan of 8k measurement points.

It is seen that the adjusted standard deviations for the 8k scans (1*8k, 2*8k, 4*8k and 10*8k) are approximately the same. It is contemplated that the variation between these gives an estimate of the uncertainty of the measurements.

It is seen that the standard deviation is the same for 1*8k+16*1k and 2*8k+8*1k, respectively. Thus, it is contemplated that the error from the large amplitude portion of the interference signal is reduced to a level, where other types of noise dominate, when more than 8 scans are performed of the large amplitude portion of the signal. Thus, in the present experiment no more than approx. 8 scans of the large amplitude portion of the interference signal seem to be required, in order to statistically reduce the noise in this part of the signal to a level where the noise in the flange parts of the signal dominates.

I claim:

1. A method for obtaining information on the electromagnetic spectrum of a sample, the method comprising generating a plurality of substantially identical interference signals, determining the shape of a first number of the signals by performing a first number of scans of a first range of signal width, determining the shape of a second number of the signals by performing a second number of scans of a second range of signal width, the second range being inside the first range and comprising a portion of the first range in which the signals have maximum absolute amplitude, combining data from the first number of scans and the second number of scans so as to obtain data corresponding to the shape of the signals, and performing a mathematical transformation of the combined data so as to obtain the information on the electromagnetic spectrum of the sample.

2. A method according to claim 1, wherein the first and second number of scans of the signals are performed by determining the amplitude of the signals at a multitude of positions along the shape of the signals.

3. A method according to claim 1, wherein the second range comprises substantially all parts of the signals of the second number of the signals wherein the absolute amplitude of the signals is at least 1%, of the maximum absolute amplitude of the signals.

4. A method according to claim 1, wherein the signals are oscillating signals.

5. A method according to claim 4, wherein the oscillating signals are generated by Nuclear Magnetic Resonance (NMR).

6. A method according to claim 1, wherein the electromagnetic spectrum is chosen from the group consisting of absorption spectrum, reflection spectrum and transmission spectrum.

7. A method according to claim 6, wherein the plurality of substantially identical signals are interference signals generated by an interferometer.

8. A method according to claim 7, wherein the interferometer comprises two light paths having optical lengths, where the optical length of one light path may be varied.

9. A method according to claim 7, wherein the interferometer is the interferometer of a Fourier Transform InfraRed (FTIR) instrument.

10. A method according to claim 1, wherein the number of scans in the first number of scans is less than 100.

11. A method according to claim 1, wherein the number of scans in the second number of scans is larger than 1.

12. A method according to claim 8, wherein the determinations performed in the first and second number of scans are performed equidistantly as a function of the optical path length variation.

13. A method according to claim 2, wherein the number of determinations of each of the first number of scans is larger than 100.

14. A method according to claim 1, wherein the mathematical transformation of the combined data is chosen from the group consisting of Fourier transformation, cosine transformation, sine transformation, Hadamar transformation, Hilbert transformation, Hartley transformation and Wavelet transformation.

15. A method according to claim 6, wherein the information on the electromagnetic spectrum of the sample is the absorption spectrum of the sample.

16. A method according to claim 15, wherein the resolution on the absorption axis of the absorption spectrum of the sample is better than 0.1 absorbance units, such as better than 0.08 absorbance units, preferably better than 0.05 absorbance units.

17. A method according to claim 15, wherein the resolution on the frequency axis of the absorption spectrum of the sample is better than 200 cm$^{-1}$.

18. A method according to claim 1, wherein the shape of a third number of the signals is determined by performing a third number of scans of a third range of signal width, the third range being comprised by the first range and comprising a portion of the first range in which the signals have maximum absolute amplitude, the data from the third number of scans being combined with the data from the first and second numbers of scans so as to obtain the data corresponding to the shape of the signals.

19. A method according to claim 9, wherein the determinations performed in the first and second number of scans are performed equidistantly as a function of the optical path length variation.

* * * * *

UNITED STATES PATENT AND TRADEMARK OFFICE
CERTIFICATE OF CORRECTION

PATENT NO : 5,771,096
DATED : June 23, 1998
INVENTOR(S): Hans Villemoes ANDERSEN It is certified that error appears in the above-identified patent and that said Letters Patent is hereby corrected as shown below:

IN THE CLAIMS:

Please amend claim 16 as follows.

16. A method according to claim 15, wherein the resolution on the absorption axis of the absorption spectrum of the sample is better than 0.1 absorbance units[, such as better than 0.08 absorbance units, preferably better than 0.05 absorbance units].

Signed and Sealed this

First Day of December, 1998

*Attest:*

BRUCE LEHMAN

*Attesting Officer*  *Commissioner of Patents and Trademarks*